United States Patent
Campbell

(10) Patent No.: US 9,596,054 B1
(45) Date of Patent: *Mar. 14, 2017

(54) OPTICAL FIBER SIGNAL QUALITY MEASURING AND REPORTING IN AVIATION SYSTEMS AND RELATED METHOD

(71) Applicant: Rockwell Collins, Inc., Cedar Rapids, IA (US)

(72) Inventor: Thomas B. Campbell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/172,962

(22) Filed: Jun. 3, 2016

Related U.S. Application Data

(63) Continuation of application No. 14/099,696, filed on Dec. 6, 2013, now Pat. No. 9,389,949.

(51) Int. Cl.
*G01R 31/28* (2006.01)
*H04L 1/00* (2006.01)
*H04B 10/079* (2013.01)
*G06F 11/10* (2006.01)

(52) U.S. Cl.
CPC ........ *H04L 1/0045* (2013.01); *G06F 11/1004* (2013.01); *H04B 10/07953* (2013.01)

(58) Field of Classification Search
CPC H04B 10/07953; H04B 10/00; H04B 10/079; G06F 11/1004
See application file for complete search history.

(56) References Cited

U.S. PATENT DOCUMENTS

| | | | |
|---|---|---|---|
| 6,396,601 B1 | 5/2002 | Takara et al. | |
| 2002/0141009 A1 | 10/2002 | Yu et al. | |
| 2002/0171885 A1 | 11/2002 | Rasztovits-Wiech et al. | |
| 2004/0126109 A1 | 7/2004 | Downie | |
| 2004/0190899 A1 | 9/2004 | Torii et al. | |
| 2004/0197097 A1 | 10/2004 | Downie et al. | |
| 2005/0063497 A1 | 3/2005 | Mahlab et al. | |
| 2006/0114457 A1 | 6/2006 | Schmitz et al. | |
| 2007/0025292 A1* | 2/2007 | Maksymczuk | H04W 24/10 370/331 |
| 2008/0285970 A1 | 11/2008 | Shake et al. | |
| 2009/0317077 A1 | 12/2009 | Krummrich | |
| 2011/0116569 A1 | 5/2011 | Vaughan et al. | |
| 2014/0112155 A1* | 4/2014 | Lindoff | H04W 24/08 370/242 |

* cited by examiner

*Primary Examiner* — David Ton
(74) *Attorney, Agent, or Firm* — Angel N. Gerdzhikov; Donna P. Suchy; Daniel M. Barbieri

(57) ABSTRACT

A system and method are disclosed for measurement and reporting of signal quality in an optical data link in terms of Bit Error Rate (BER). The system and method of optical fiber signal quality measurement is highly accurate in early determination of signal degradation, is computationally simple in implementation, and is immune to instability with variable temperature and other environmental factors. Counting a number of error free Cyclic Redundancy Checks (CRC) of a plurality of video signals, the computationally simple method limits the data analysis required to determine a link OK, a link degraded and a link fault status of the optical data link.

20 Claims, 17 Drawing Sheets

High BER Sort
If "Video Frame Valid CRCs" >= "High BER 1", "Video Channel BER" = "High BER 1 Report"
If "Video Frame Valid CRCs" >= "High BER 2", "Video Channel BER" = "High BER 2 Report"
If "Video Frame Valid CRCs" >= "High BER 3", "Video Channel BER" = "High BER 3 Report"
If "Video Frame Valid CRCs" >= "High BER 4", "Video Channel BER" = "High BER 4 Report"
If "Video Frame Valid CRCs" >= "High BER 5", "Video Channel BER" = "High BER 5 Report"
If "Video Frame Valid CRCs" >= "High BER 6", "Video Channel BER" = "High BER 6 Report"
If "Video Frame Valid CRCs" >= "High BER 7", "Video Channel BER" = "High BER 7 Report"
If "Video Frame Valid CRCs" >= "High BER 8", "Video Channel BER" = "High BER 8 Report"
If "Video Frame Valid CRCs" >= "High BER 9", "Video Channel BER" = "High BER 9 Report"
If "Video Channel BER" = "High BER 10 Report"

FIG. 6

Low BER Sort
If "Video Valid Frames" <= "Low BER 01", "Video Channel BER" = "Low BER 01 Report"
If "Video Valid Frames" <= "Low BER 02", "Video Channel BER" = "Low BER 02 Report"
If "Video Valid Frames" <= "Low BER 03", "Video Channel BER" = "Low BER 03 Report"
If "Video Valid Frames" <= "Low BER 04", "Video Channel BER" = "Low BER 04 Report"
If "Video Valid Frames" <= "Low BER 05", "Video Channel BER" = "Low BER 05 Report"
If "Video Valid Frames" <= "Low BER 06", "Video Channel BER" = "Low BER 06 Report"
If "Video Valid Frames" <= "Low BER 07", "Video Channel BER" = "Low BER 07 Report"
If "Video Valid Frames" <= "Low BER 08", "Video Channel BER" = "Low BER 08 Report"
If "Video Valid Frames" <= "Low BER 09", "Video Channel BER" = "Low BER 09 Report"
If "Video Valid Frames" <= "Low BER 10", "Video Channel BER" = "Low BER 10 Report"
If "Video Valid Frames" <= "Low BER 11", "Video Channel BER" = "Low BER 11 Report"
If "Video Valid Frames" <= "Low BER 12", "Video Channel BER" = "Low BER 12 Report"
If "Video Valid Frames" <= "Low BER 13", "Video Channel BER" = "Low BER 13 Report"
If "Video Valid Frames" <= "Low BER 14", "Video Channel BER" = "Low BER 14 Report"
If "Video Valid Frames" <= "Low BER 15", "Video Channel BER" = "Low BER 15 Report"
If "Video Valid Frames" <= "Low BER 16", "Video Channel BER" = "Low BER 16 Report"
If "Video Valid Frames" <= "Low BER 17", "Video Channel BER" = "Low BER 17 Report"
If "Video Valid Frames" <= "Low BER 18", "Video Channel BER" = "Low BER 18 Report"
If "Video Valid Frames" <= "Low BER 19", "Video Channel BER" = "Low BER 19 Report"
If "Video Valid Frames" <= "Low BER 20", "Video Channel BER" = "Low BER 20 Report"
If "Video Valid Frames" <= "Low BER 21", "Video Channel BER" = "Low BER 21 Report"
"Video Channel 1 BER" = "Low BER 22 Report"

FIG. 7

| Channel BER | Feedback Message 150 | Object 2 Time to Error | | | |
|---|---|---|---|---|---|
| | 0 to C | Seconds | Minutes | Hours | Days |
| Spare | D | 0.00 | 0.00 | 0.00 | 0.00 |
| 5.5E-07 | E | 0.00 | 0.00 | 0.00 | 0.00 |
| 1.0E-07 | F | 0.01 | 0.00 | 0.00 | 0.00 |
| 5.5E-08 | 10 | 0.05 | 0.00 | 0.00 | 0.00 |
| 1.0E-08 | 11 | 0.09 | 0.00 | 0.00 | 0.00 |
| 5.5E-09 | 12 | 0.47 | 0.01 | 0.00 | 0.00 |
| 1.0E-09 | 13 | 0.86 | 0.01 | 0.00 | 0.00 |
| 5.5E-10 | 14 | 4.72 | 0.08 | 0.00 | 0.00 |
| 1.0E-10 | 15 | 8.57 | 0.14 | 0.00 | 0.00 |
| 5.5E-11 | 16 | 47.15 | 0.79 | 0.01 | 0.00 |
| 1.0E-11 | 17 | 85.73 | 1.43 | 0.02 | 0.00 |
| 5.5E-12 | 18 | 471.51 | 7.86 | 0.13 | 0.01 |
| 1.0E-12 | 19 | 857.30 | 14.29 | 0.24 | 0.01 |
| 5.5E-13 | 1A | 4,715.13 | 78.59 | 1.31 | 0.05 |
| 1.0E-13 | 1B | 8,572.96 | 142.88 | 2.38 | 0.10 |
| 5.5E-14 | 1C | 47,151.31 | 785.86 | 13.10 | 0.55 |
| 1.0E-14 | 1D | 85,729.65 | 1,428.83 | 23.81 | 0.99 |
| 5.5E-15 | 1E | 471,513.07 | 7,858.55 | 130.98 | 5.46 |
| 1.0E-15 | 1F | 857,296.48 | 14,288.27 | 238.14 | 9.92 |
| 5.5E-16 | 20 | 4,715,130.67 | 78,585.51 | 1,309.76 | 54.57 |
| 1.0E-16 | 21 - 62 | | | | |
| Spare | 63 | | | | |
| Measuring Data | | | | | |

FIG. 12

| | Bits | Range | Data Source | Data Consumer | Serial Bus? | Arinc Bus | Rate | |
|---|---|---|---|---|---|---|---|---|
| Video Valid Frame Count | 29 bits | 0 - 282,907,839d | Unloader | Unloader | No | No | | After the video link to the display is stabilized, this register is used to count the number of whole video frames received without CRC errors. |
| Video Frame CRC Count | 12 bits | 0 - 2100d | Unloader | Unloader | No | No | | - This register contains the number of Object 2 (i.e. pixel data) words received by the display.<br>- This data is sent from the Unloader to the Controller via the serial bus.<br>- A count of 2100 indicates that no Object 2 words were received in error. |
| Link OK Threshold | 29 bits | 0 - 282,907,839d | Flash | Unloader via Controller | Yes | No | | |
| Link Degraded Threshold | 29 bits | 0 - 282,907,839d | Flash | Unloader via Controller | Yes | No | | |
| Video Frame Valid CRCs | 12 bits | 0 - 2100d | Unloader | Controller | Yes | No | | - This register captures the value of the Video Frame CRC Count register received from the Unloader via the serial bus when a CRC fault is detected on the video channel.<br>- The maximum value of this word is 2100. |
| Video Valid Frames | 29 bits | 0 - 282,907,839d | Unloader | Controller | Yes | No | | This register captures the contents of the Video Valid Frame Count register when a CRC fault is detected on the video channel. |
| Video Activity | 1 bit | 0 - 1d | Controller | ARINC 429 | No | Yes | 1 Hz | This register is used to store the Signal Quality Activity bit reported over the ARINC 429 bus in the Signal Quality Word (bit 7).<br><br>This bit is set to 1 when a new Signal Quality report is available. |

FIG. 14

| | Bits | Range | Data Source | Data Consumer | Serial Bus? | Arinc Bus | Rate | |
|---|---|---|---|---|---|---|---|---|
| Video Channel BER | 6 bits | 0 - 63d | Controller | ARINC 429 | No | Yes | 1 Hz | This register is used to store the measured video channel signal quality reported over the ARINC 429 bus in the Signal Quality Word (bits 0 - 6). These bit are latched until a new Signal Quality Measurement is available. |
| Link Status | 2 bits | 0 - 3d | Unloader | ARINC 429 via Controller | Yes | Yes | 1 Hz | This register is used to store the Link Status bits reported over the ARINC 429 bus in the Signal Quality Word (bits 8 - 9). |
| High BER 1 – 10 | 29 | 0 - 282,907,839d | Flash | Controller | No | No | | These registers are used to store the values that the channel signal quality algorithm will use to sort against. There are corresponding values stored in the High BER X Report register. When a value is selected by the sort, the corresponding High BER X Report word will be written to the Video Channel BER register. |
| High BER 1 – 10 Report | 6 bits | 0 - 63d | Flash | Controller | No | No | | These values are associated with the High BER X values. When the High BER sort selects the associated High BER value, the corresponding High BER X Report word is loaded to the ARINC 429 Signal Quality register for transmission over the ARINC 429 bus. |

FIG. 15

| | Bits | Range | Data Source | Data Consumer | Serial Bus? | Arinc Bus | Rate | |
|---|---|---|---|---|---|---|---|---|
| Low BER 1-22 | 29 | 0 - 282,907,839d | Flash | | | | | These registers are used to store the values that the channel signal quality algorithm will use to sort against. There are corresponding values stored in the Low BER X Report register.<br><br>When a value is selected by the sort, the corresponding Low BER X Report word will be written to the Video Channel BER register. |
| Low BER 1-22 Report | 6 bits | 0 - 63d | Flash | Controller | No | No | | These values are associated with the Low BER X values. When the Low BER sort selects the associated Low BER value, the corresponding Low BER X Report word is loaded to the ARINC 429 Signal Quality register for transmission over the ARINC 429 bus. |
| Measuring Data Report | 6 bits | 0 - 63d | Flash | Controller | No | No | | |

FIG. 16

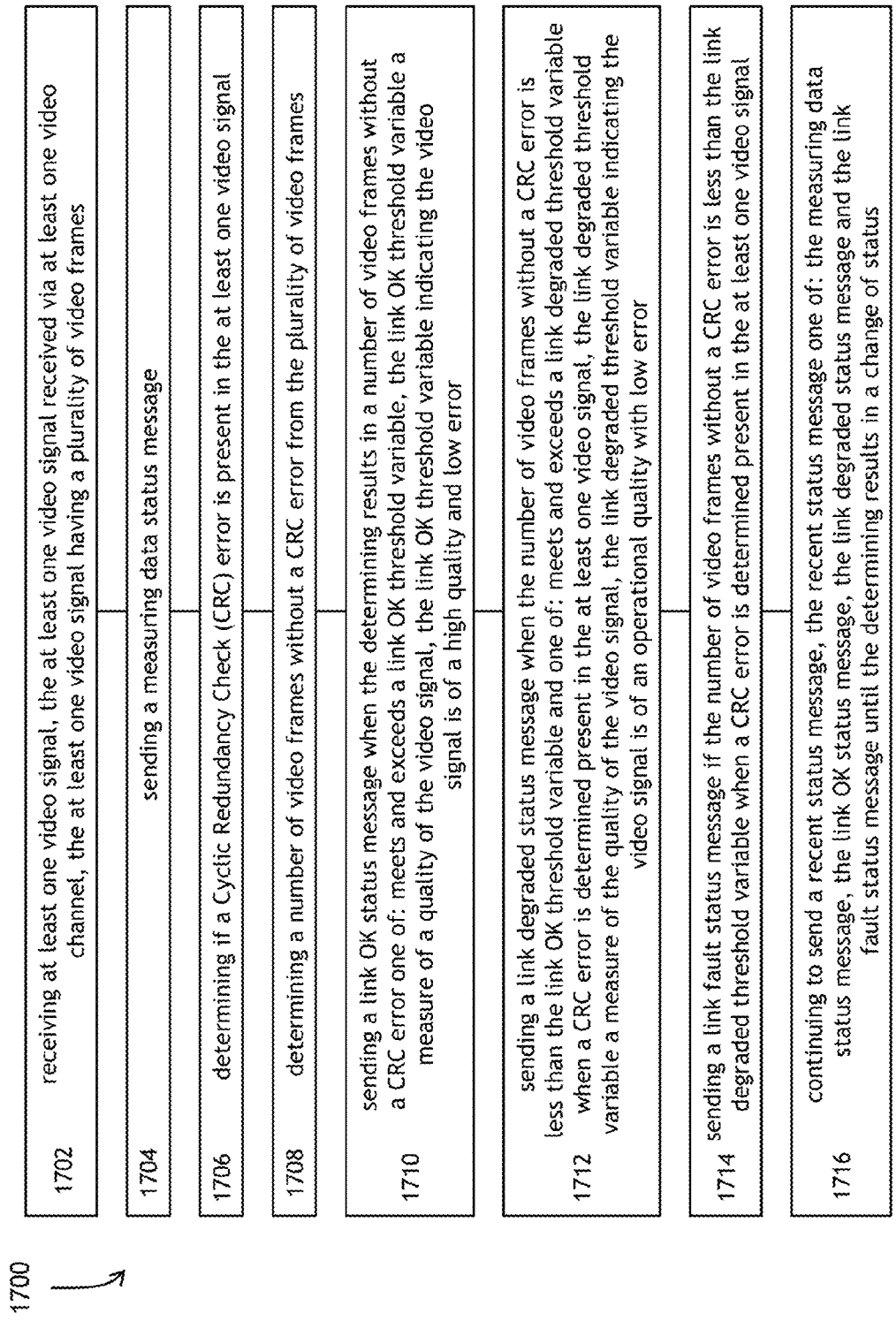

OPTICAL FIBER SIGNAL QUALITY MEASURING AND REPORTING IN AVIATION SYSTEMS AND RELATED METHOD

This application is a continuation of U.S. Pat. No. 9,389,949, by Thomas B. Campbell, filed Dec. 6, 2013, and issued on Jul. 12, 2016, which is incorporated herein by reference in its entirety.

FIELD OF THE INVENTION

The present invention relates generally to detection of errors in optical fiber signal transmission. More particularly, embodiments of the present invention relate to a system and method for early detection of a degraded optical fiber signal through continuous analysis of a bit error rate.

BACKGROUND OF THE INVENTION

Many display applications may be connected via an associated data link or "data bus" to facilitate networked communication. In some data bus connections, an optical fiber data link may be used as the hardware layer to provide this communication medium between applications. For example, a Display Processing Computer (DPC) may provide a signal and transmit the signal to an adaptive flight display (AFD) device capable of displaying an image associated with the signal.

The quality of the optical fiber data link signal may degrade due to a number of causes including a fault at the source, a fault at the receiver and a fault with the optical fiber. Before signal quality degradation to a level of system failure, an operator may desire a signal quality measurement before an operation is cancelled or delayed due to surprise system failure.

The quality of this optical data link may be a valuable tool in early diagnosis of an increasing fault. Optical fiber data link signal quality status may be a helpful tool in preferred early diagnosis of an insidious data link problem before the insidious problem may degrade to a system failure. For example, fine dust may migrate into optical link interface between a cable and a display, reducing signal quality to a level that may degrade the ability of the display to properly function.

An unplanned data link outage may result in maintenance delays and ultimately, loss of valuable time of operation. For example, an unplanned data link outage in an aircraft display may result in unplanned maintenance activity to return the aircraft to active service, causing delays or cancellations of scheduled operations. Unplanned maintenance may also be ultimately more expensive than preventative maintenance.

In practice, operators may attempt to clean contact points of the optical data link physical layer to avoid physical signal degradation. For example, maintenance personnel may swab, with a cleaning solution, the connection points of optical fiber hardware in order to clean any debris from the fiber before reconnection. While helpful, this practice may only attempt to prevent a signal degradation of the physical layer.

Several approaches based on power measurement of the optical signal have been proposed but have found limited success. Most have marginal effectiveness from limitations in capabilities and/or application. For example, one shortfall of a power measurement scheme is a difficulty to measure power accurately with changing temperature. With a variable temperature, signal power may not be an accurate measurement of signal quality.

Consequently, a need exists for a system and method for accurate optical data link signal measurement enabling an operator to diagnose signal degradation before the degradation rises to a system failure.

SUMMARY OF THE INVENTION

Accordingly, an embodiment of the present invention is directed to a method for measuring and reporting optical fiber signal quality, comprising: receiving at least one video signal, the at least one video signal received via at least one video channel, the at least one video signal having a plurality of video frames, sending a measuring data status message, determining if a Cyclic Redundancy Check (CRC) error is present in the at least one video signal, determining a number of video frames without a CRC error from the plurality of video frames, sending a link OK status message when the determining results in a number of video frames without a CRC error one of: meets and exceeds a link OK threshold variable, the link OK threshold variable a measure of a quality of the video signal, the link OK threshold variable indicating the video signal is of a high quality and low error, sending a link degraded status message when the number of video frames without a CRC error is less than the link OK threshold variable and one of: meets and exceeds a link degraded threshold variable when a CRC error is determined present in the at least one video signal, the link degraded threshold variable a measure of the quality of the video signal, the link degraded threshold variable indicating the video signal is of an operational quality with low error, sending a link fault status message if the number of video frames without a CRC error is less than the link degraded threshold variable when a CRC error is determined present in the at least one video signal, continuing to send a recent status message, the recent status message one of: the measuring data status message, the link OK status message, the link degraded status message and the link fault status message until the determining results in a change of status.

An additional embodiment of the present invention is directed to a method wherein determining if a CRC error is present in the at least one video signal further comprises: setting a video valid frame count to zero, reading a video frame CRC count, comparing the video frame CRC count to a first variable, determining a CRC error is present if the video frame CRC count is less than the first variable, and: setting a video frame valid CRC variable to the video frame CRC count, setting a video valid frames variable to the video valid frame count, sending the video frame valid CRC variable, sending the video valid frames variable, and reclearing the video valid frame count, determining no CRC error is present if the video frame CRC count equals the first variable, and: incrementing the video valid frame count by one, and rereading the video frame CRC count.

An additional embodiment of the present invention is directed to a method wherein determining if a CRC error is present in the at least one video signal further comprises: receiving the video frame valid CRC variable, receiving the video valid frames variable, sorting to determine a video channel bit error rate via a high bit error rate sort if the video valid frames variable does not equal zero, sorting to determine the video channel bit error rate via a low bit error rate sort if the video valid frames variable equals zero, incrementing a video valid frame count by one, determining if new data is present, setting a video activity bit to zero if no new data is present, setting the video activity bit to one if new data is present, sending the video channel bit error rate, and sending the video activity bit.

An additional embodiment of the present invention is directed to a method wherein sending the video channel bit error rate and the video activity bit further comprises sending in an ARINC 429 Digital Information Transfer System standard format.

An additional embodiment of the present invention is directed to a method wherein the first variable equals 2100 and the at least one video channel further comprises a four channel ARINC 818 video signal.

An additional embodiment of the present invention is directed to a system for measuring and reporting optical fiber link signal quality, comprising: a link status report module configured for: receiving at least one video signal, the at least one video signal received via at least one video channel, the at least one video signal having a plurality of video frames, sending a measuring data status message, determining if a Cyclic Redundancy Check (CRC) error is present in the at least one video signal, determining a number of video frames without a CRC error from the plurality of video frames, sending a link OK status message when the determining results in a number of video frames without a CRC error one of: meets and exceeds a link OK threshold variable, the link OK threshold variable a measure of a quality of the video signal, the link OK threshold variable indicating the video signal is of a high quality and low error, sending a link degraded status message when the number of video frames without a CRC error is less than the link OK threshold variable and one of: meets and exceeds a link degraded threshold variable when a CRC error is determined present in the at least one video signal, the link degraded threshold variable a measure of the quality of the video signal, the link degraded threshold variable indicating the video signal is of an operational quality with low error, sending a link fault status message if the number of video frames without a CRC error is less than the link degraded threshold variable when a CRC error is determined present in the at least one video signal, continuing to send a recent status message, the recent status message one of: the measuring data status message, the link OK status message, the link degraded status message and the link fault status message until the determining results in a change of status, a video valid frames module configured for: setting a video valid frame count to zero, reading a video frame CRC count, comparing the video frame CRC count to a first variable, determining a CRC error is present if the video frame CRC count is less than the first variable, and: setting a video frame valid CRC variable to the video frame CRC count, setting a video valid frames variable to the video valid frame count, re-clearing the video valid frame count, determining no CRC error is present if the video frame CRC count equals the first variable, and: incrementing the video valid frame count by one, rereading the video frame CRC count, sorting to determine a video channel bit error rate via a high bit error rate sort if the video valid frames variable does not equal zero, sorting to determine the video channel bit error rate via a low bit error rate sort if the video valid frames variable equals zero, incrementing a video valid frame count by one, determining if new data is present, setting a video activity bit to zero if no new data is present, setting the video activity bit to one if new data is present, sending the video channel bit error rate, and sending the video activity bit.

An additional embodiment of the present invention is directed to a non-transitory computer readable medium having non-transitory computer readable program code embodied therein for measuring and reporting optical fiber signal quality, the computer readable program code comprising instructions which, when executed by a computer device or processor, perform and direct the steps of: receiving at least one video signal, the at least one video signal received via at least one video channel, the at least one video signal having a plurality of video frames, sending a measuring data status message, determining if a Cyclic Redundancy Check (CRC) error is present in the at least one video signal, determining a number of video frames without a CRC error from the plurality of video frames, sending a link OK status message when the determining results in a number of video frames without a CRC error one of: meets and exceeds a link OK threshold variable, the link OK threshold variable a measure of a quality of the video signal, the link OK threshold variable indicating the video signal is of a high quality and low error, sending a link degraded status message when the number of video frames without a CRC error is less than the link OK threshold variable and one of: meets and exceeds a link degraded threshold variable when a CRC error is determined present in the at least one video signal, the link degraded threshold variable a measure of the quality of the video signal, the link degraded threshold variable indicating the video signal is of an operational quality with low error, sending a link fault status message if the number of video frames without a CRC error is less than the link degraded threshold variable when a CRC error is determined present in the at least one video signal, continuing to send a recent status message, the recent status message one of: the measuring data status message, the link OK status message, the link degraded status message and the link fault status message until the determining results in a change of status, setting a video valid frame count to zero, reading a video frame CRC count, comparing the video frame CRC count to a first variable, determining a CRC error is present if the video frame CRC count is less than the first variable, and: setting a video frame valid CRC variable to the video frame CRC count, setting a video valid frames variable to the video valid frame count, re-clearing the video valid frame count, determining no CRC error is present if the video frame CRC count equals the first variable, and: incrementing the video valid frame count by one, rereading the video frame CRC count, sorting to determine a video channel bit error rate via a high bit error rate sort if the video valid frames variable does not equal zero, sorting to determine the video channel bit error rate via a low bit error rate sort if the video valid frames variable equals zero, incrementing a video valid frame count by one, determining if new data is present, setting a video activity bit to zero if no new data is present, setting the video activity bit to one if new data is present, sending the video channel bit error rate, and sending the video activity bit.

An additional embodiment of the present invention is directed to a method for measuring and reporting optical fiber link signal quality, comprising: means for receiving at least one video signal, the at least one video signal received via at least one video channel, the at least one video signal having a plurality of video frames, means for sending a measuring data status message, means for determining if a Cyclic Redundancy Check (CRC) error is present in the at least one video signal, means for counting the plurality of video frames without a CRC error, means for sending a link OK status message when the fiber link signal quality one of: meets and exceeds a link OK threshold, the link OK threshold a measure of a quality of the video signal, the link OK threshold indicating the video signal is of a high quality and low error, the fiber link signal quality based on the counting, means for sending a link degraded status message when the fiber link signal quality is less than the link OK threshold and one of: meets and exceeds a link degraded threshold when a CRC error is determined present in the at least one video signal, the link degraded threshold a measure of the quality of the video signal, the link degraded threshold indicating the video signal is of an operational quality with low error, the fiber link signal quality based on the counting, means for sending a link fault status message if the fiber link signal quality is less than the link degraded threshold when a CRC error is determined present in the at least one video signal, the fiber link signal quality based on the counting, means for continuing to send a recent status message, the recent status message one of: the measuring data status message, the link OK status message, the link degraded status message and the link fault status message until the determining results in a change of status, means for reading a video frame CRC count, means for determining if a CRC error is present, means for determining a video channel bit error rate, means for sending the video channel bit error rate.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6 is a diagram of bit error rate reports as a function of high bit error rate and Video channel bit error rate exemplary of an embodiment of the present invention;

FIG. 7 is a diagram of bit error rate reports as a function of low bit error rate and Video channel bit error rate exemplary of an embodiment of the present invention;

FIG. 12 is a diagram of exemplary reports associated with one threshold set in accordance with an embodiment of the present invention;

FIGS. 14-16 are exemplary definitions of terms used within the system and method of optical fiber signal quality measuring illustrative of an embodiment of the present invention; and FIG. 17 is a flow chart of a method for authenticating received signals illustrative of an embodiment of the present invention.

DETAILED DESCRIPTION OF THE INVENTION

Figure 1:
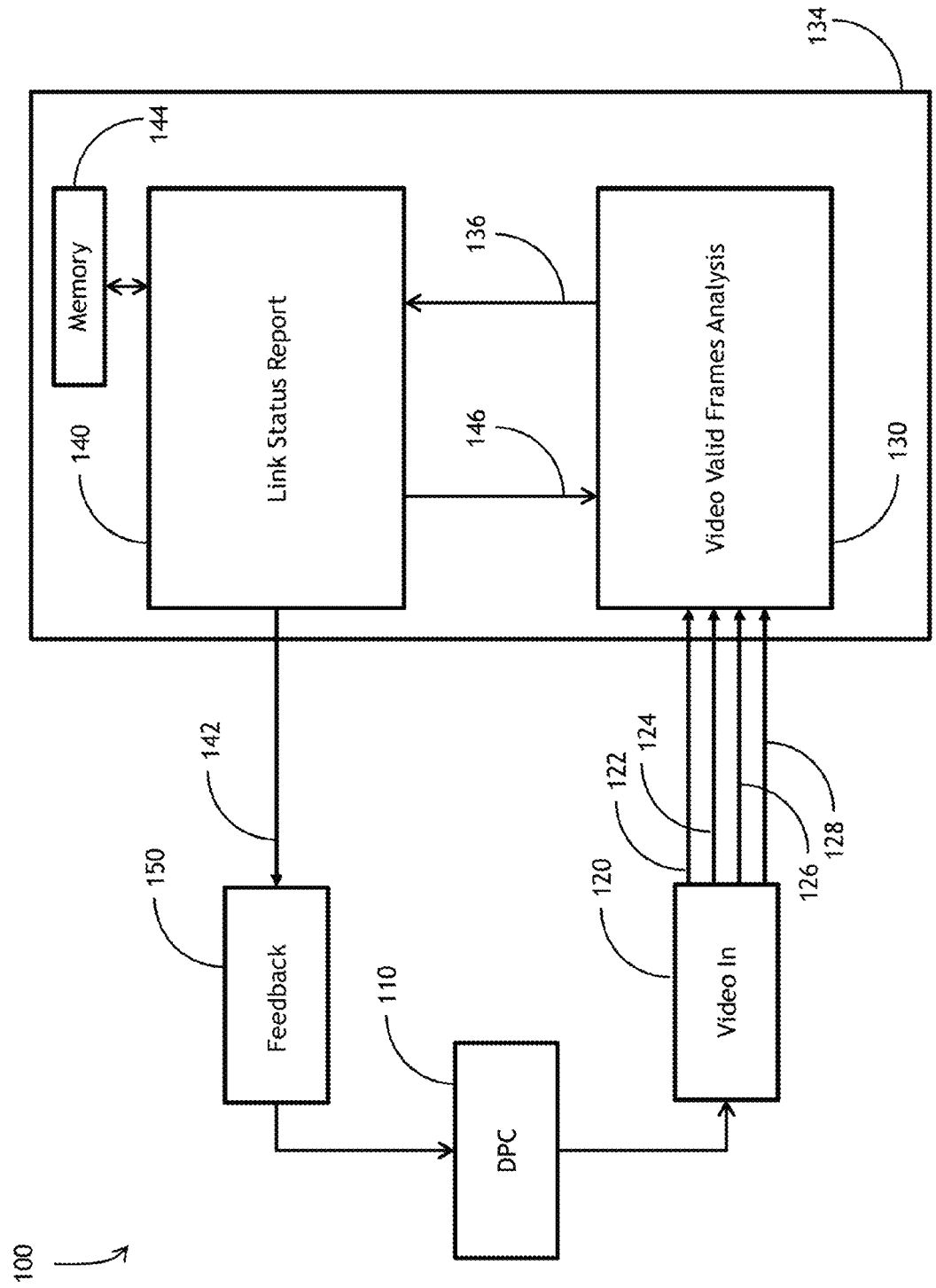
FIG. 1 is a diagram one implementation of an optical fiber signal quality measurement and reporting system illustrative of an embodiment of the present invention.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention may apply to a plurality of data links types. For example, an optical data link is described herein, however embodiments contemplated herein may apply to additional forms of transmission layer infrastructure including, but not limited to, copper based wired data link transmission layers and radio frequency data wireless data link.

Embodiments of the present invention may employ a classification of optical fiber data bus signal quality using an expression of bit error rate (BER). BER may be defined and used herein as an expected number of bits in error divided by a sample size. Bit errors may emerge from a plurality of sources but are a statistical certainty in each data bus and may be used as a basis for optical signal quality analysis. In the case of an optical data link, bit errors may be a result of light loss within the transmission of the optical data. Reflections of light reflecting back to the source may act to interfere with the desired data signals. Transmitter noise combined with receiver noise may add to the bit errors inherent to an optical link. Once above this "noise floor", a signal may be successfully received until the signal strength decreases below the noise floor.

Embodiments of the present invention may be implemented as a firmware solution as well as additional implementations. For example, one implementation of the present invention may include a firmware system implemented in parallel with an existing optical data link able to evaluate the existing data link. Additional embodiments of the present invention may be incorporated to a structure of an optical data link transmission element and a structure of an optical data link receiver element to facilitate link performance quality measurements.

Embodiments of the present invention are directed to a system and related method for measurement of signal quality in optical data link in terms of BER. The present invention discloses a method of optical fiber signal quality measurement using BER which is highly accurate in early determination of signal degradation, is computationally simple in implementation, and is immune to instability with variable temperature and other environmental factors. In addition, methods herein may maintain no impact on recurring costs. For example, with implementation of the methods and systems herein, a manufacturer may realize no escalation in per unit costs over the production lifetime of the system and method.

A system may be designed to operate at a minimum system BER wherein a BER performance below the system minimum has no perceivable user benefit. This BER "threshold effect" may be an example of a BER level above which the system may become inoperable. Below the threshold, service quality may not improve regardless of the orders of magnitude the BER is below the threshold. As long as the threshold is exceeded (a lower BER), signal quality remains relatively constant. For example, a cell phone drop out effect may indicate a BER above the threshold (a higher BER) causing the signal to immediately terminate. Once the BER increases to a level above the threshold, the link may disappear and communication may not occur.

Referring to FIG. 1, a diagram one implementation of an optical fiber signal quality measurement and reporting system illustrative of an embodiment of the present invention is shown. System 100 may comprise a display processing computer (DPC) 110 capable of creating video signals for output to a display. DPC 110 may specially configure video signals may for an aviation implementation via an aviation related standard. One standard for aviation related video signals may be in accordance with an Aeronautical Radio Incorporated (ARINC) 818 standard for aviation video 120. An exemplary four channel video signal including channels 122, 124, 126 and 128 may carry signals from DPC 110 to additional applications.

Video valid frames analysis 130 may operate to perform processing of each of the multiple optical signals 122-128 enroute to display 134. Further described herein below. Video valid frames analysis 130 may preferably employ a field programmable gate array (FPGA) integrated circuit to execute video valid frames analysis processing. In operation, video valid frames analysis 130 may send BER and link quality reports to link status report 140 for additional processing and transfer. In one embodiment, BER/link status 136 may be determined by counting error free frames until a Cyclic Redundancy Check (CRC) error is detected, then reporting link status from a look up table within memory 144. In embodiments, video valid frames analysis 130 may determine BER/link quality 136 and report to link status report 140 via a serial bus.

One goal of system 100 is active management of the size of data analyzed to perform the optical data link signal quality measurement. Should a method attempt to count each frame/packet of data received in a display, the amount of data required may become unmanageable. System 100 overcomes this limitation by limiting the data counted to CRC error free frames.

A measurement of link signal quality may be based directly on BER. A high quality signal of low error rate (BER) may be defined as a signal free from limitation in data flow for the desired operational environment. Such a high quality signal may operate at an optimum data flow rate (e.g. megabits per second (Mbps), gigabits per second (Gbps), terabits per second (Tbps)) of the designed optical network. A user of a high quality data link of low error rate may perceive no limitations to the signal transmitted via the link.

A signal of operational quality with low error may be defined as a signal substantially free from limitation in data flow for the desired operational environment. Such an operational quality signal may operate at a data flow rate less than the high quality link of the designed optical network. A user of an operational quality data link of low error rate may perceive an intermittent limitation in the signal transmitted via the operational quality link.

A signal attempting transmission through a data link maintaining a link fault may not be able to successfully transit. A link fault may preclude successful data transmission of data required to create usable data on the receiving end.

Display 134 may operate to display appropriate signals received from the DPC 110. In some embodiments of system 100, display 134 may be a Liquid Crystal Display (LCD) or the like to display received video signals.

Preferably, display 134 architecture may be configured to minimize the impact of system 100 implementation, integration and verification. For example, system 100 may be configured for coupling with a specific display 134 currently in operation onboard a vehicle. As a separate but integrated optical fiber signal quality measurement system, embodiments of system 100 may be specifically configured for a specific display.

Link status report 140 may operate to receive reports from video valid frames analysis 130 and to report status of the optical signals 122-128 back to the DPC 110. In operation, link status report 140 may employ an FPGA to perform a process to transmit link status 146 including desired thresholds to video valid frames analysis 130. In one embodiment, link 146 status determined by counting error free frames until CRC error is detected, then reporting link status from a look up table.

In embodiments, link status report 140 may provide video valid frames analysis 130 with thresholds 146 for link status report via a serial bus. Here, system 100 may be configured for thresholds 146 to be loaded by an operator via a calibration file. This configuration may preferably allow for empirical tuning of link status report during system 100 integration. System 100 may employ common thresholds (FIG. 11) among a plurality of display 134 units.

Preferably, system 100 may balance the operation of optical data link quality measurement over both video valid frames analysis 130 and link status report 140 to take advantage of the qualities inherent in each. Link status report 140 may remain static and capable of accessing memory 144 while video valid frames analysis 130 may possess faster processing capabilities to enable system 100 quality measurements. Embodiments of system 100 may minimize integration/verification risk at the FPGA Level while also minimizing integration/verification effort at the Circuit Card Assembly (CCA)/Line Replaceable Unit (LRU) level.

In one embodiment, memory 144 may be incorporated within system 100 to enable link status report 140 access to stored information. Memory 144 may be configured as non-volatile memory and may include data accessible by a plurality of types of link status report 140.

In one embodiment, both video valid frames analysis 130 and link status report 140 may be implemented within FPGA to accomplish appropriate function. Operational and environmental considerations may lead to a specific implementation and combination of elements to accomplish the methods herein.

System 100 may further include a feedback mechanism 142 for a display to provide a feedback signal to the DPC 110. In one embodiment, link status report 140 may store signal quality words in memory 144 and report over an established feedback mechanism 142. One example of an established feedback mechanism 142 may include an ARINC 429 Digital Information Transfer System bus operating within feedback message 150 using a twisted cable as the physical layer for feedback transmission to the DPC 110. An additional system within which embodiments of the present invention may function may include a 664P1-1 Aircraft Data Network in use upon large transport category aircraft. Additionally, embodiments of the present invention may apply to digital data transfer systems found in ground based vehicles. One such digital video transfer system may include a 629 Part 1-5—Multi-Transmitter Data Bus applicable in some railroad systems.

Figure 2:
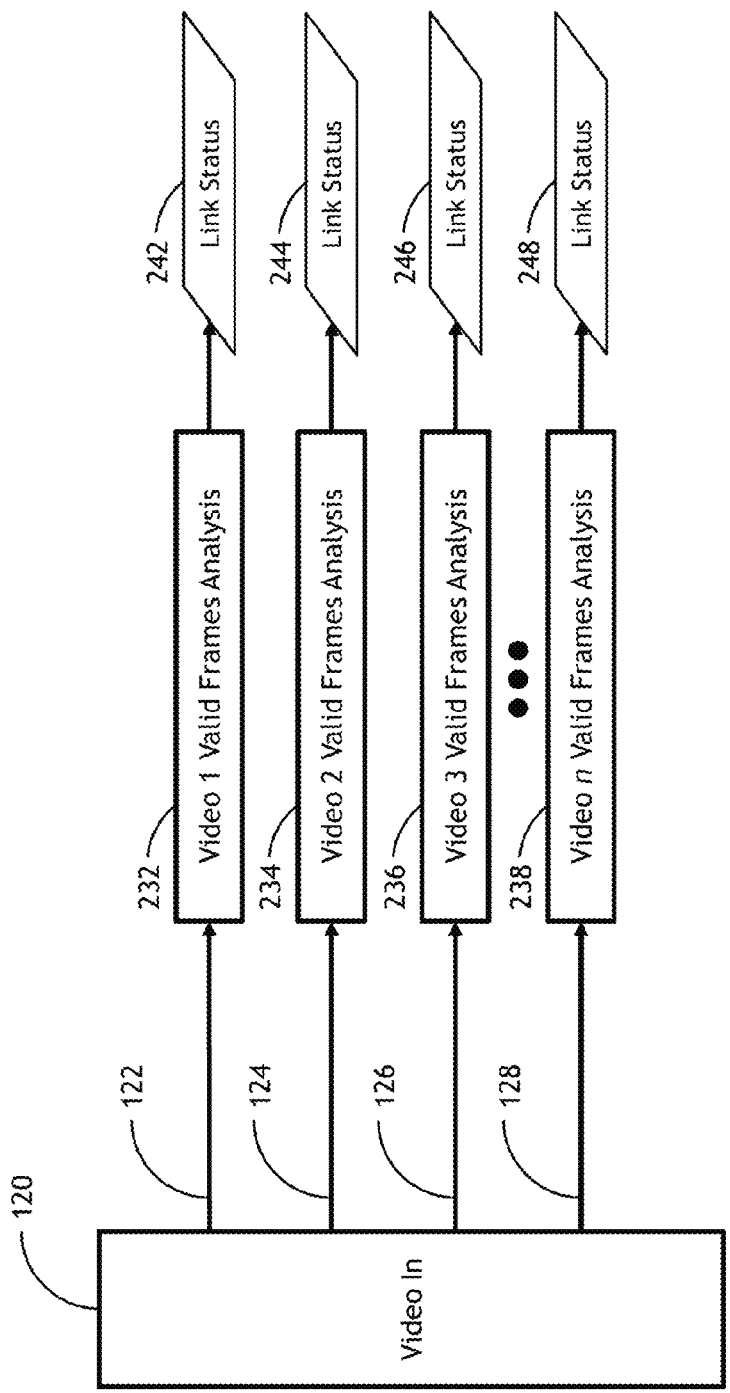
FIG. 2 is a diagram of a plurality of video signals subject to analysis illustrative of an embodiment of the present invention.

Referring to FIG. 2, a diagram of a plurality of video signals subject to analysis illustrative of an embodiment of the present invention is shown. Video signals 122-128 may preferably be subject to analysis via video channel 1 valid frames analysis 232, video channel 2 valid frames analysis 234, video channel 3 valid frames analysis 236 and video channel n valid frames analysis 238. From these individual analysis of each signal, system 100 may produce an individual link status report 242, 244, 246, and 248.

Figure 3:
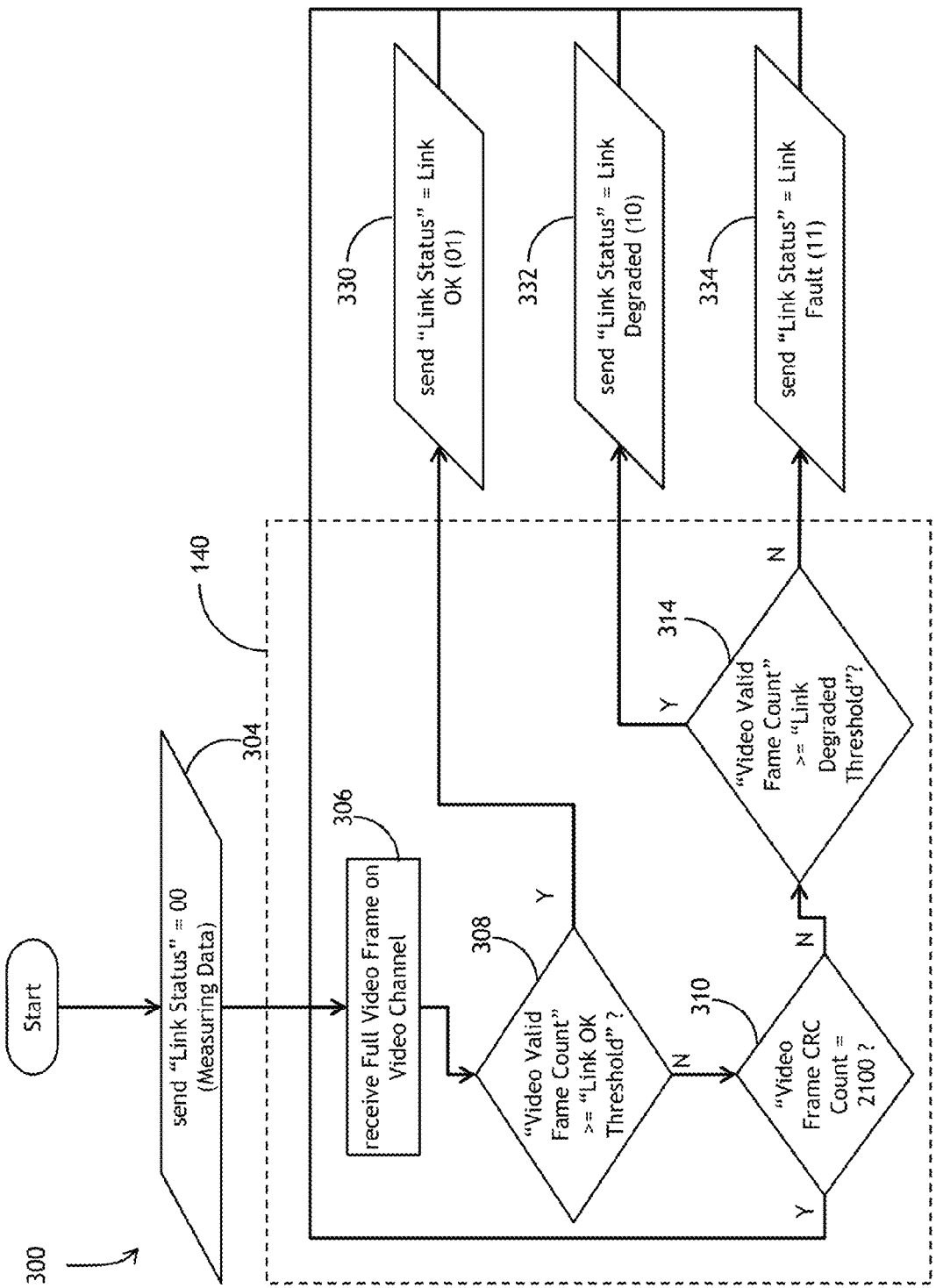
FIG. 3 is a logic diagram of a link status analysis illustrative of an embodiment of the present invention.

Referring to FIG. 3, a logic diagram of a link status analysis illustrative of an embodiment of the present invention is shown. Before the link may be quantified, process 300 is unable to determine a quality of the link and step 304 may begin with sending "Link Status"=Measuring Data (00). Step 306 may receive a Full Video Frame on Video one of the video channels. Step 308 may compare the value of "Video Valid Fame Count" with "Link OK Threshold." If this comparison results in "Video Valid Fame Count">="Link OK Threshold," logic passes to step 330 where process 300 sends "Link Status"=Link OK (01). Should the step 308 comparison result in "Video Valid Fame Count"<"Link OK Threshold," logic will pass to step 310.

Step 310 may query "Video Frame CRC Count=2100? If the result is yes, then there is no CRC error, and logic process returns to step 306 to receive another full video frame. If process 300 may find that Video Frame CRC Count is less than 2100, indicating a CRC error, logic will pass to step 314 to determine the magnitude of the error.

Step 314 may determine whether the link status is above or below the link degraded threshold by comparing "Video Valid Fame Count">="Link Degraded Threshold"? If yes, then logic passes to step 332 where process 300 sends "Link Status"=Link Signal Degraded (10). Should step 314 determine "Video Valid Fame Count"<"Link Degraded Threshold," logic passes to step 334 where process 300 sends "Link Status"=Link Fault (11).

In one implementation, process 300 may configure the link status message (Measuring Data, Link OK, Link Degraded and Link Fault) for output to a common video standard architecture. For example, one such common video standard may include an ARINC 429 video bus incorporated within video architecture of an aircraft.

Figure 4:
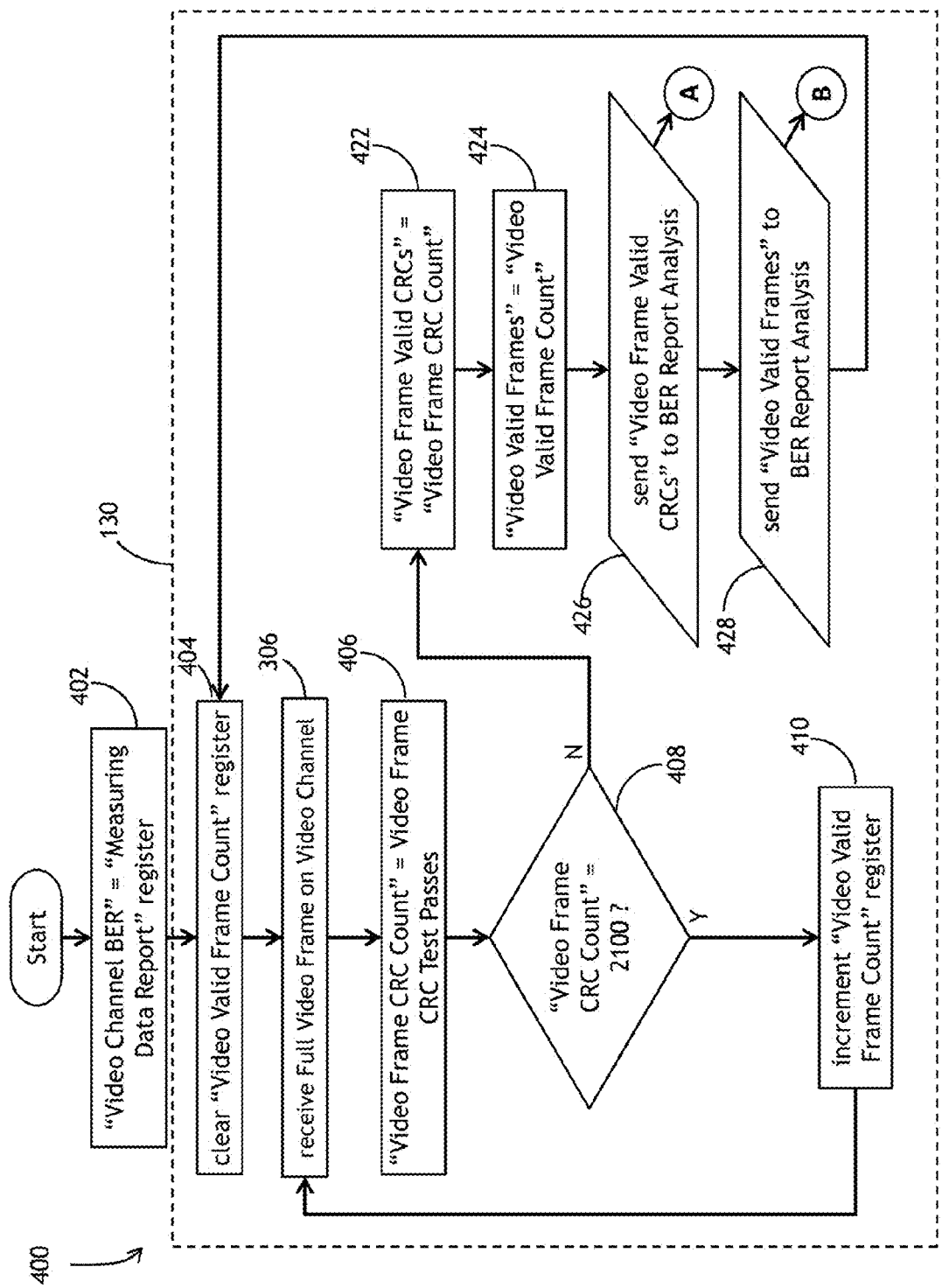
FIG. 4 is a logic diagram of a video valid frames analysis illustrative of an embodiment of the present invention.

Referring to FIG. 4, a logic diagram of a video valid frames analysis illustrative of an embodiment of the present invention is shown. Process 400 may begin at step 402 with setting "Video Channel BER"="Measuring Data Report" register and, at step 404 with clearing "Video Valid Frame Count" register. Process 400 receives full video frame on at least one video channel at step 306. And, at step 406, process 400 may set "Video Frame CRC Count"=Video Frame CRC Test Passes. At step 408 process 400 may query whether "Video Fame CRC Count"=2100. If so, there is no CRC error and process 400 may Increment "Video Valid Frame Count" register at step 410, determine there is valid frame information and return to step 306 to receive a second full video frame on video channel.

If "Video Fame CRC Count" does not equal 2100, process 400 determines there is a CRC error and logic passes to step 422 with "Video Frame Valid CRCs"="Video Frame CRC Count" and step 424 with "Video Valid Frames"="Video Valid Frame Count." As there registers are populated, process may then send "Video Frame Valid CRCs" at step 426 and send "Video Valid Frames" To Control FPGA (29 bits) at step 428. Once this is complete, process 400 may return to step 404.

Figure 5:
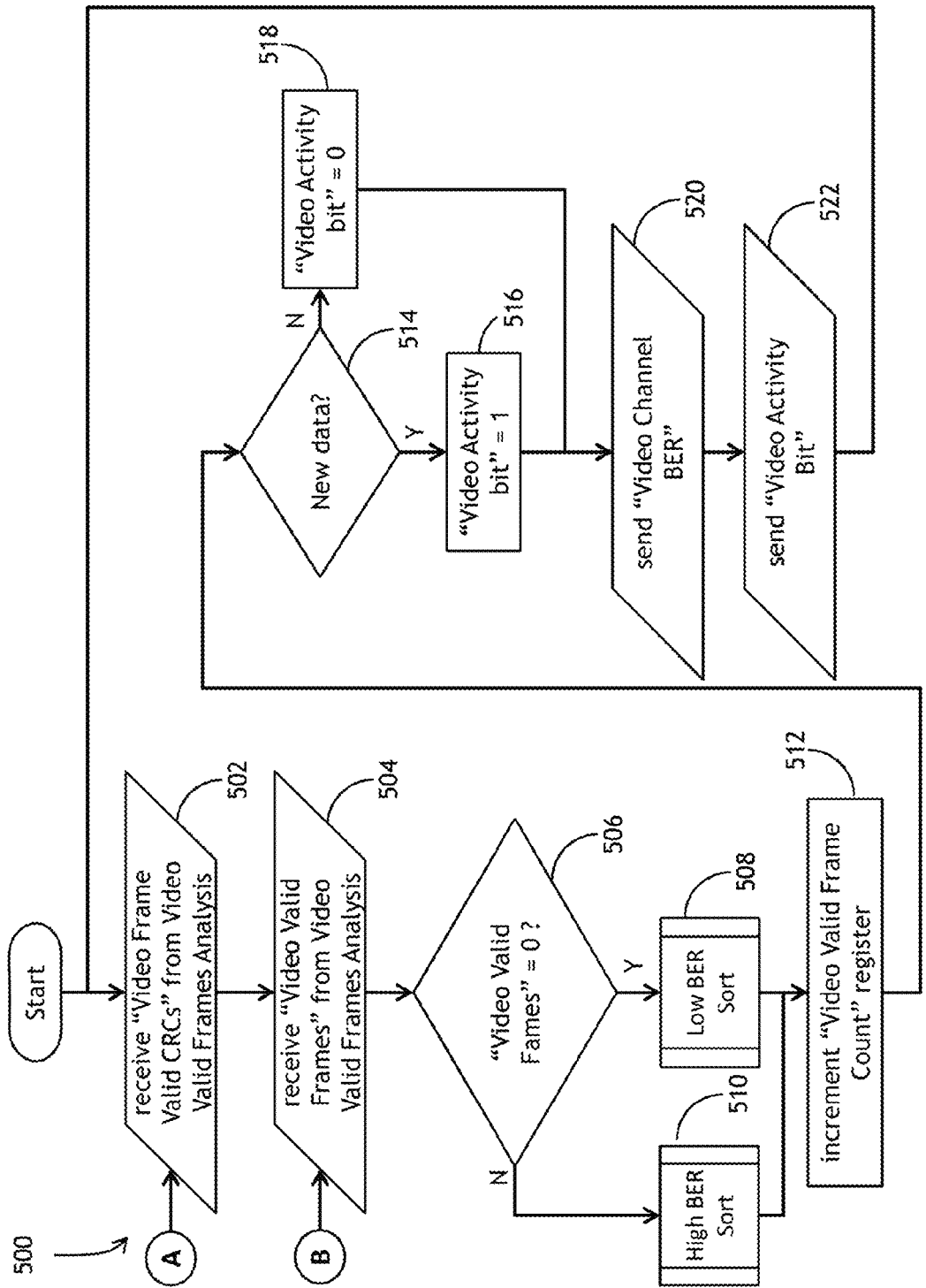
FIG. 5 is a logic diagram of a bit error rate report illustrative of an embodiment of the present invention.

Referring to FIG. 5, a logic diagram of a bit error rate report illustrative of an embodiment of the present invention is shown. Process 500 may begin at step 502 with receiving "Video Frame Valid CRCs" from Video Valid Frames Analysis 426. At step 504 process 500 receives "Video Valid Frames" from Video Valid Frames Analysis 428. Next, at step 506 process 500 queries whether "Video Valid Fames"=0. If so, process 500 continues to step 508 and executes a Low BER sort 508. If not, process 500 continues to step 510 with a High BER Sort.

Once either of the sorts is complete, process 500 may continue with incrementing "Video Valid Frame Count" register at step 512. Step 514 checks if new data (a new signal quality report) from video valid frames analysis is available. If not, Process 500 may set "Video Activity bit"=0 while if there is a new report available, process 500 may set "Video Activity bit"=1. Logic continues to step 520 with sending "Video Channel BER" to feedback message 150 (e.g., ARINC 429) (6 bits) and sending "Video Activity Bit" to feedback message 150 (1 bits). Once these reports are sent, process 500 may return to step 502.

Referring to FIG. 6, a diagram of bit error rate reports as a function of high bit error rate and Video channel bit error rate exemplary of an embodiment of the present invention is shown. As process 500 commands a high BER sort 510, the BER report may correspond to the relationship between Video Frame Valid CRCs and High BER 1 through 10.

Referring to FIG. 7, a diagram of bit error rate reports as a function of low bit error rate and Video channel bit error rate exemplary of an embodiment of the present invention is shown. As process 500 commands a low BER sort 508, the low BER report may correspond to the relationship between Video Valid Frames and Low BER 1 through 22.

Figure 8:
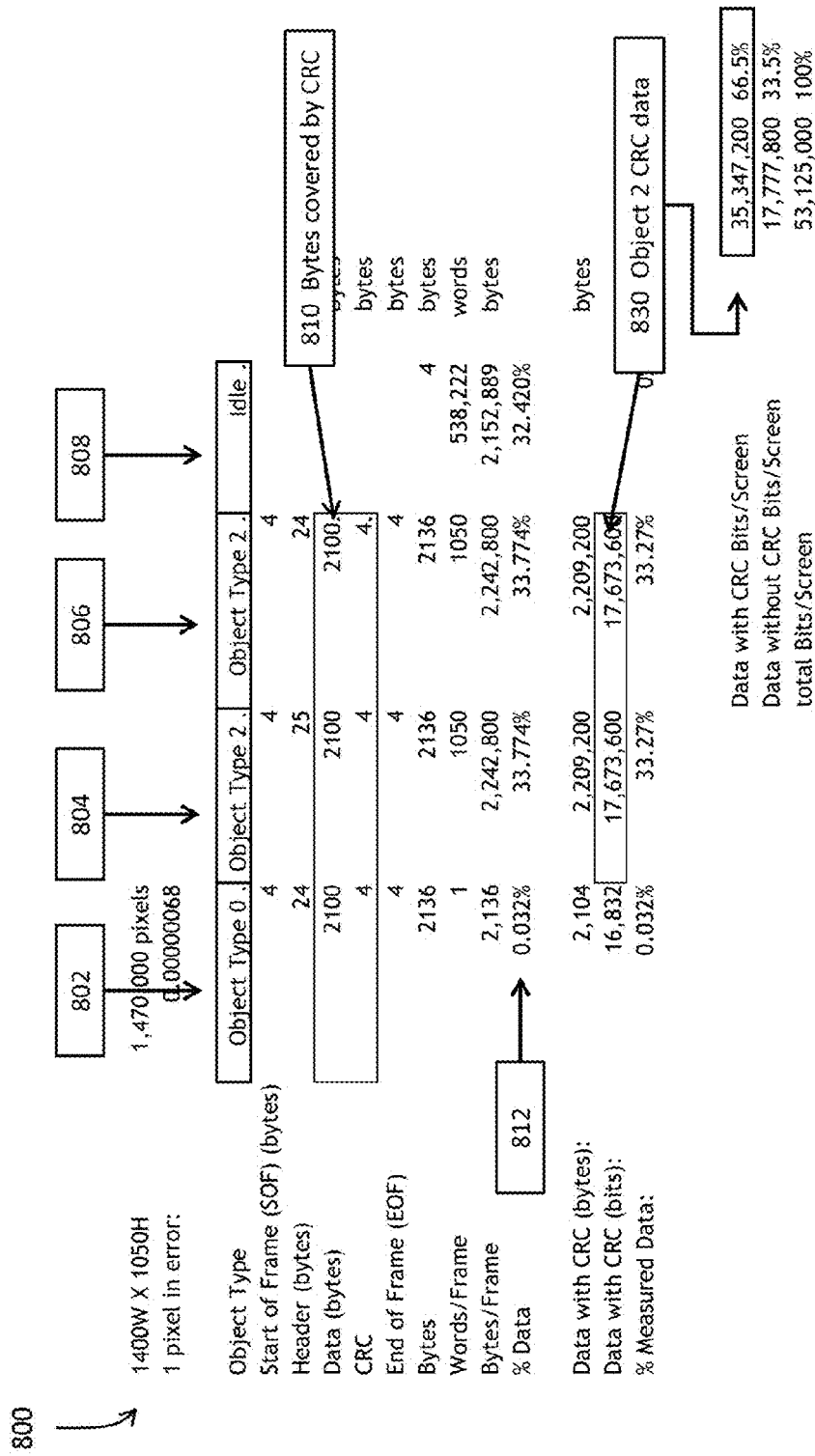
FIG. 8 is a listing of exemplary signal quality data as measured and analyzed by an embodiment of the present invention.

Referring to FIG. 8, a listing of exemplary signal quality data as measured and analyzed by an embodiment of the present invention is shown. System 100 may measure signal quality based on an analysis of specific sets of data. In one embodiment, system 100 may measure a set of data defined by an additional standard. For example, one additional standard for video transmission may include an ARINC 818 standard for video transmission. It is contemplated herein; embodiments of the present invention may analyze sets of data defined by a plurality of additional standard types not specifically mentioned herein.

In the case of measuring data sets defined by an ARINC 818 standard, system 100 may analyze object type 2 CRC data 830 to determine BER of the optical signal. Under the ARINC 818 standard, there is a limited amount of data checked for error via a CRC. This limited amount of data may indicate the overall health of signal quality. For example, system 100 may analyze an exemplary approximately 66.5% of the data 830 to determine overall signal quality health.

Within the ARINC 818 standard, data may be segmented into object type 0 data 802, object type 2 data 804, a second segment of object type 2 data 806 and idle data 808. Of this data, system 100 may analyze each of the object type 2 data sets 804 806 for CRC indications. The data sets are indicated in a percentage of total data 812 listed as 0.032% 802 33.774% 804, 33.774% 806 and 32.42% 808.

Within the data sets, system 100 may analyze, using a CRC, a limited set of data 810 including object type 0 data 802 and object type 2 data 804 806. As indicated, idle data 808 is not subject to the CRC, and, although object type 0 data 802 is subject to CRCs, it is optionally unused in certain embodiments. Additional embodiments of the present invention may analyze object type 0 data 802 as well as idle data 808 using an error detection technique and additional testing metrics.

Bit errors are agnostic in location of occurrence. A physical characteristic of each data link. As an error is detected within the 66.5% of the data 830 in transit, system 100 may scale an error rate for the entire system. With this limited analysis of 66.5% 830, system 100 may maintain a high confidence level associated with signal quality detection. System 100 may further analyze the entirety of data in transit between DPC 110 and display 134, however, one embodiment herein may limit the analysis (e.g., to each of the object type 2 data sets 804 806) in order for system 100 to remain a flexible and cost effective alternative.

Figure 9:
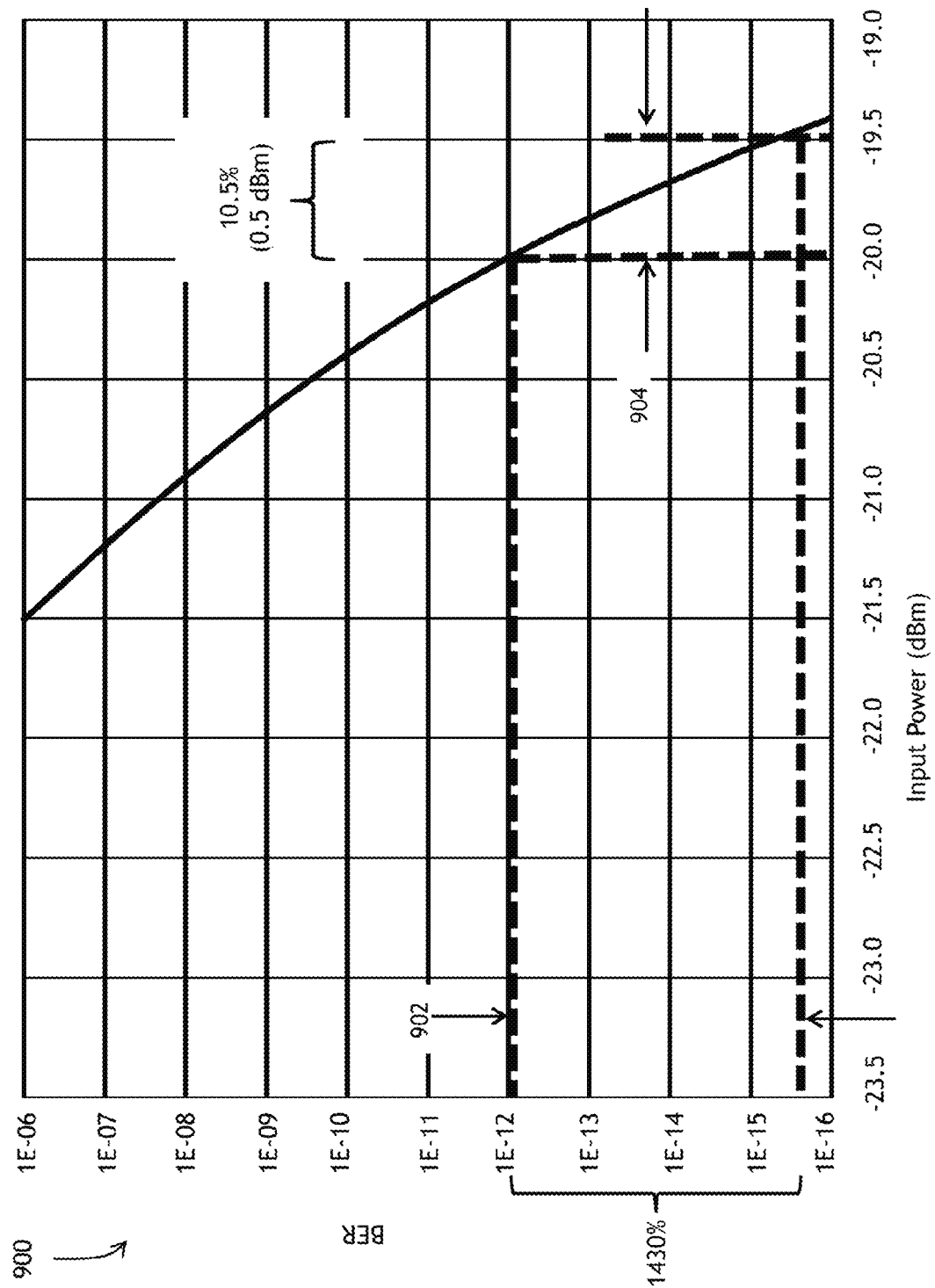
FIG. 9 is a graph of bit error rate over input power exemplary of an embodiment of the present invention.

Referring to FIG. 9, a graph of bit error rate over peak signal/root mean square noise exemplary of an embodiment of the present invention is shown. In some systems, BER may be highly leveraged on signal power. A small change 904 in signal power has drastic effect 902 on BER. For example, in FIG. 4, a 10.5% reduction in power from −19.5 dBm to −20 dBm may correspond to a 1430% change in BER from 7E-16 to approximately 10E-12. This leverage may aid embodiments of the present invention to determine a solution to a loss in optical cable signal quality.

Figure 10:
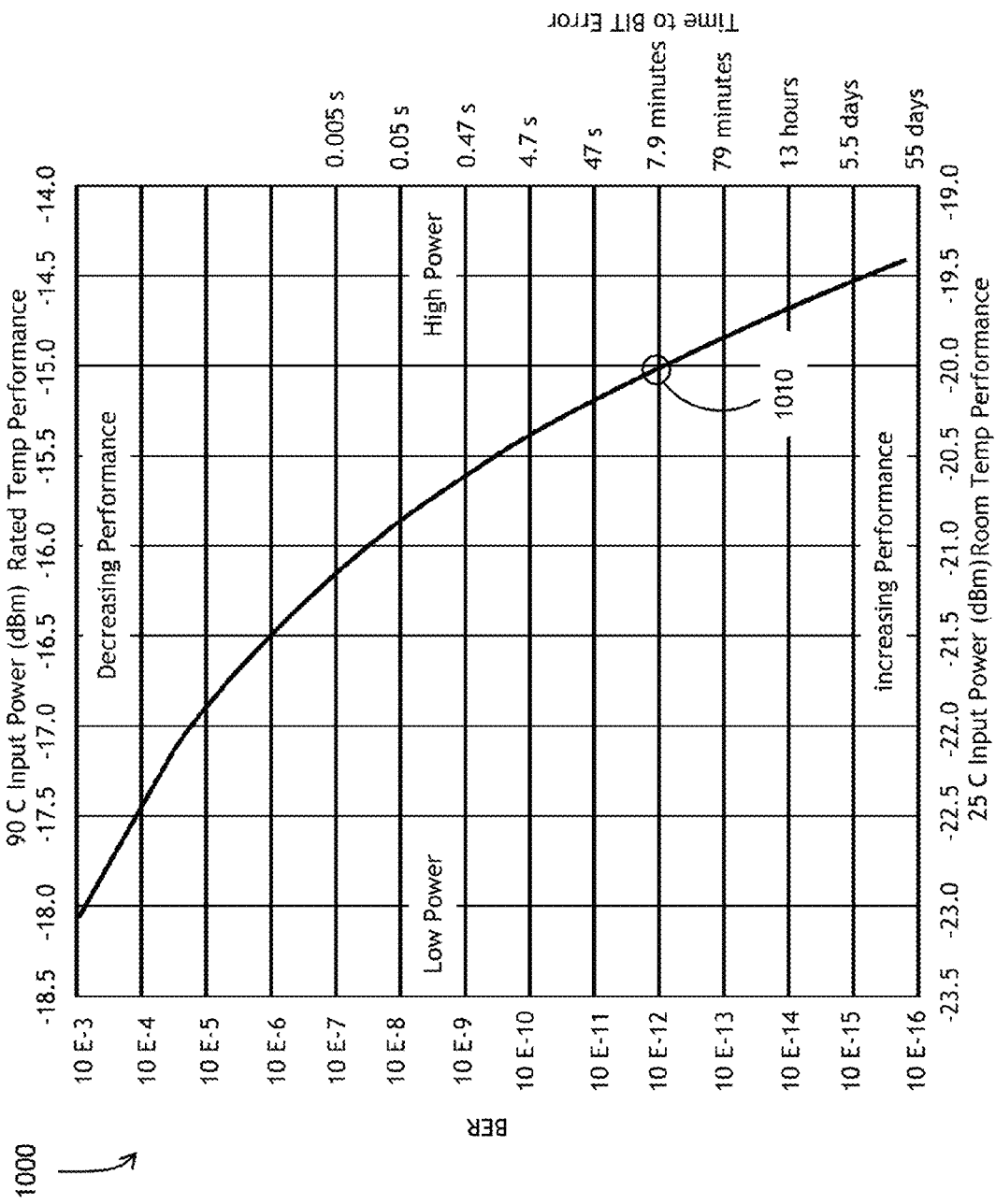
FIG. 10 is a graph of bit error rate over power indicating a sensitivity curve of an optical receiver exemplary of an embodiment of the present invention.

Referring to FIG. 10, a graph of bit error rate over power indicating a sensitivity curve of an optical receiver exemplary of an embodiment of the present invention is shown. One system may guarantee a performance including an optimal point 1010 indicating $10^{-12}$ BER at −15 dBm power at 90 degrees C. rated temperature. At a room temperature, a similar system may guarantee the same BER at −20.0 dBm. As temperature increases from room ambient (25 C) to rated (90 C), a system may require more than three times the power to operate the data link.

System 100 may further analyze the data in a relationship of BER to time to a bit error. For example, at $10^{-7}$, a typical system may experience a bit error each 0.005 seconds. This relationship grows to a corresponding bit in error approximately every 8 minutes at a BER of $10^{-12}$.

Figure 11:
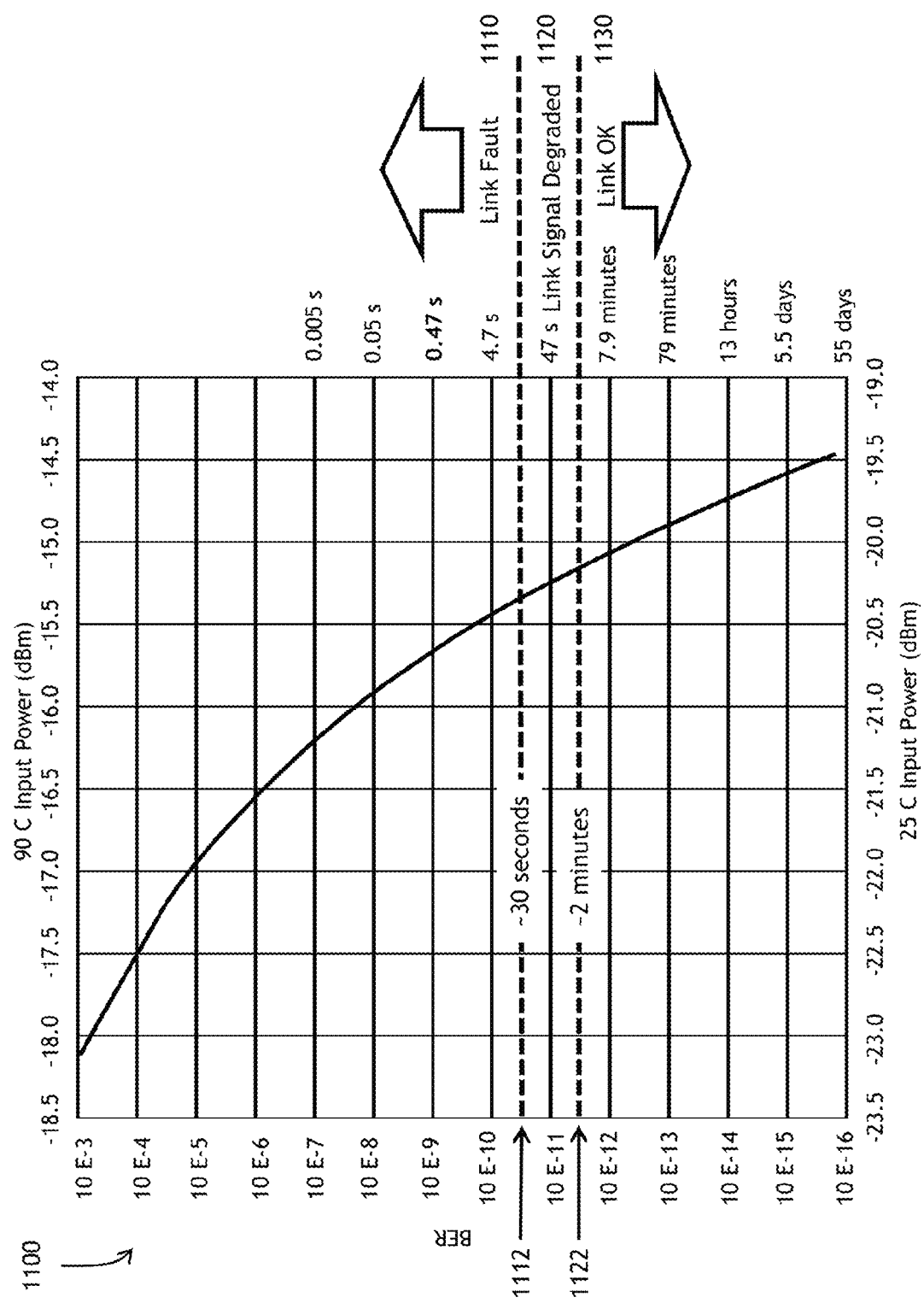
FIG. 11 is a graph of bit error rate over power with associated exemplary link status thresholds illustrative of an embodiment of the present invention.

Referring to FIG. 11, a graph of bit error rate over power with associated exemplary link status thresholds illustrative of an embodiment of the present invention is shown. Within the bounds of a reliable optical data link, system 100 may employ specific thresholds to reference in determining whether the optical data link is operable. Thresholds may be dynamic in nature and, depending on the data link analyzed by system 100, may be adjustably set at a plurality of different levels to guarantee desired performance.

At a link OK threshold 1122, system 100 may declare the link as operable and send a message indicating link OK 1130. Between the link OK threshold 1122 and a link fault threshold 1112, system 100 may send a message indicating a degraded state 1120 of the link. With BER increasing above the link fault threshold 1112, system 100 may send a message indicating a link fault 1110.

Referring to FIG. 12, a diagram of exemplary reports associated with one threshold set in accordance with an embodiment of the present invention is shown. At a low BER where system 100 may determine a bit error is present every 2 minutes, system 100 may declare the link as operable and send a link OK message indicating link OK 1130. Between the link OK threshold 1122 and a link fault threshold 1112, system 100 may send a message indicating a degraded state 1120 of the link. With BER increasing above the link fault threshold 1112, system 100 may send a message indicating a link fault 1110. System 100 may issue feedback message 150 in a hexadecimal format via the feedback mechanism 142. As system 100 measures the optical data link BER, it may report the BER status accordingly via the hexadecimal feedback message 150. For example, a channel BER of 5.5E-12 may correspond to a feedback message 17.

Figure 13:
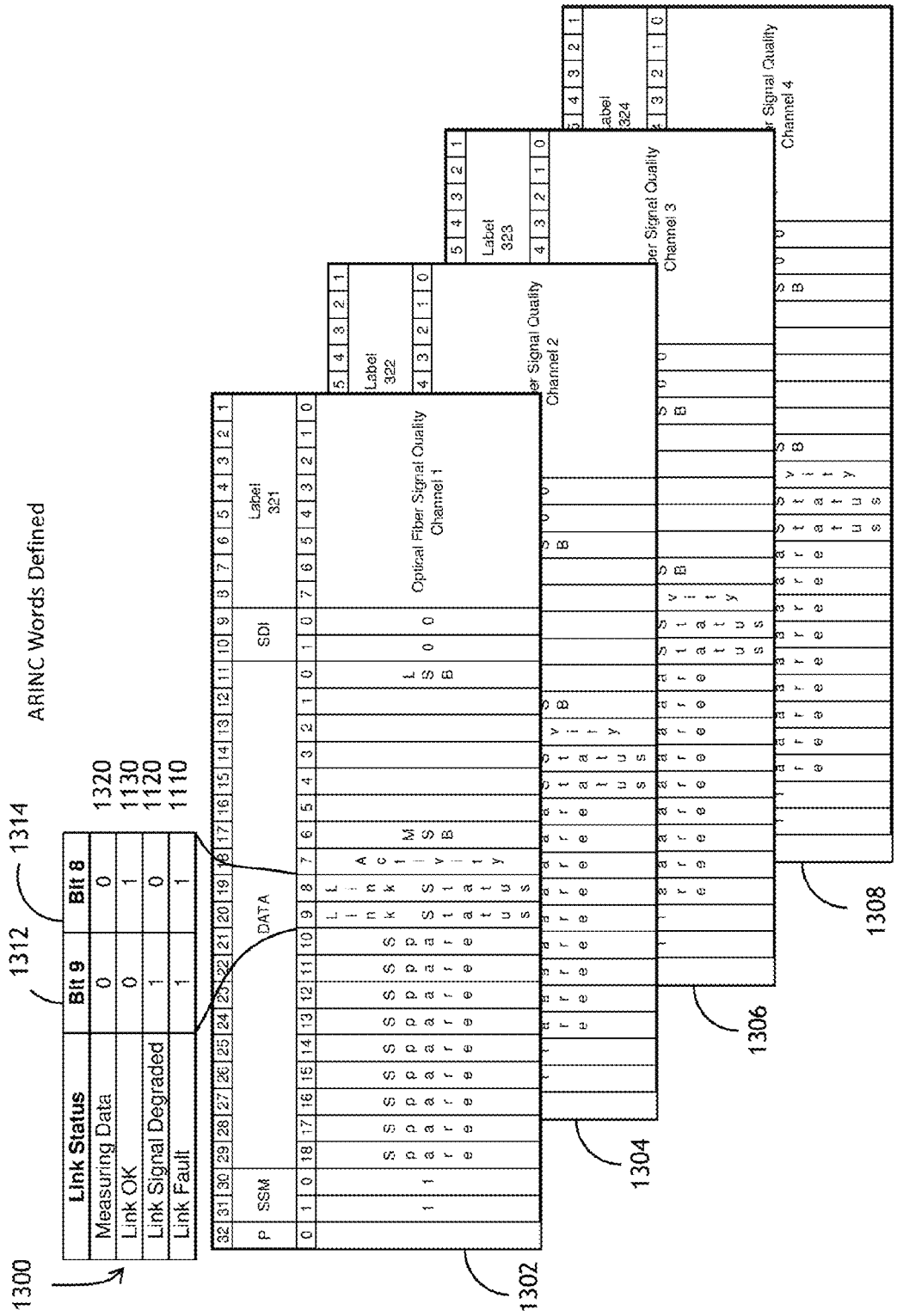
FIG. 13 is a diagram of exemplary reports generated by an embodiment of the present invention.

Referring to FIG. 13, a diagram of exemplary reports generated by an embodiment of the present invention is shown. An exemplary four channel video channels 1-4, 122, 124, 126 and 128 may carry the four channel video from DPC 110 to a display 134. Similarly, under the ARINC 429 standard, system 100 may employ an optical fiber signal quality feedback messages 1302, 1304, 1306 and 1308 for video channels 1-4 from a display 134 back to the DPC 110. At a preferable update rate at an exemplary one hertz, the feedback message 150 may travel within ample excess capacity of the feedback mechanism 142 indicating a low risk method of transmission for the feedback message 150.

System 100 may employ and exemplary bit 9 1312 and bit 8 1314 to carry the feedback message 150 from display 134 to DPC 110. Feedback message 150 may be one of an exemplary four separate messages including measuring data 1320, link OK 1130, link signal degraded 1120 and link fault 1110. A measuring data 1320 report may indicate the display is in the process of measuring data and no link status is available. A link OK message 1130 may indicate the optical data link is operational and system 100 has not determined a degraded or fault status. Link signal degraded 1120 may indicate one threshold 1122 has been exceeded and display 134 may not presented signals in a normal manner. Link fault 1110 message may indicate an additional threshold 1112 has been reached and system 100 determines the optical data link may indicate a fault. With any of these messages, the optical data link may still be operational to a degree. However, an operator may use the system 100 generated messages to determine a proper course of action.

Referring to FIGS. 14-16, exemplary definitions of terms used within the system and method of optical fiber signal quality measuring illustrative of an embodiment of the present invention are shown. As used herein, Video Valid Frame Count may be defined as a register where after the video link to the display is stabilized, this register is used to count the number of whole video frames received without CRC errors. As used herein, Video Frame CRC Count may be defined as a register containing the number of Object 2 (i.e. pixel data) words received by the display. This data is sent from the video valid frames analysis to the link status report via the serial bus. A count of 2100 indicates that no Object 2 words were received in error.

As used herein, Video Frame Valid CRCs may be defined as a register capturing the value of the Video Frame CRC Count register received from the video valid frames analysis via the serial bus when a CRC fault is detected on the video channel. In one embodiment, the maximum value of this word is 2100. As used herein, Video Valid Frames may be defined as a register capturing the contents of the Video Valid Frame Count register when a CRC fault is detected on the video channel. As used herein, Video Activity may be defined as a register used to store the Signal Quality Activity bit reported over the ARINC 429 bus in the Signal Quality Word (bit 7). This bit is set to 1 when a new Signal Quality report is available.

As used herein, Video Channel BER may be defined as a register used to store the measured video channel signal quality reported over the ARINC 429 bus in the Signal Quality Word (bits 0-6). These bit are latched until a new Signal Quality Measurement is available. As used herein, Link Status may be defined as a register used to store the Link Status bits reported over the ARINC 429 Digital Information Transfer System bus in the Signal Quality Word (bits 8-9).

Referring to FIG. 17, a flow chart of a method for authenticating received signals illustrative of an embodiment of the present invention is shown. Method 1700 may begin, at step 1702, with receiving at least one video signal, the at least one video signal received via at least one video channel, the at least one video signal having a plurality of video frames; and, at step 1704, sending a measuring data status message; and, at step 1706, determining if a Cyclic Redundancy Check (CRC) error is present in the at least one video signal; and, at step 1708, determining a number of video frames without a CRC error from the plurality of video frames; and, at step 1710, sending a link OK status message when the determining results in a number of video frames without a CRC error one of: meets and exceeds a link OK threshold variable, the link OK threshold variable a measure of a quality of the video signal, the link OK threshold variable indicating the video signal is of a high quality and low error; and, at step 1712, sending a link degraded status message when the number of video frames without a CRC error is less than the link OK threshold variable and one of: meets and exceeds a link degraded threshold variable when a CRC error is determined present in the at least one video signal, the link degraded threshold variable a measure of the quality of the video signal, the link degraded threshold variable indicating the video signal is of an operational quality with low error; and, at step 1714, sending a link fault status message if the number of video frames without a CRC error is less than the link degraded threshold variable when a CRC error is determined present in the at least one video signal; and, at step 1716, continuing to send a recent status message, the recent status message one of: the measuring data status message, the link OK status message, the link degraded status message and the link fault status message until the determining results in a change of status.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although a user is shown/described herein as a single illustrated figure, those skilled in the art will appreciate that the user may be representative of a human user, a robotic user (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method for measuring and reporting optical fiber link signal quality, comprising:
   receiving a video signal, the video signal received via a video channel, the video signal having a plurality of video frames;
   determining if a Cyclic Redundancy Check (CRC) error is present in the video signal;
   determining a number of video frames without a CRC error from the plurality of video frames; and
   sending a link OK status message when the determining results in a number of video frames without a CRC error one of: meets and exceeds a link OK threshold variable, the link OK threshold variable a measure of a quality of the video signal, the link OK threshold variable indicating the video signal is of a high quality and low error.

2. The method of claim 1, further comprising:
   sending a link degraded status message when the number of video frames without a CRC error is less than the link OK threshold variable and one of: meets and exceeds a link degraded threshold variable when a CRC error is determined present in the at least one video signal, the link degraded threshold variable a measure of the quality of the video signal, the link degraded threshold variable indicating the video signal is of an operational quality with low error.

3. The method of claim 2, wherein determining the link degraded threshold for the link degraded threshold variable comprises a tiered determination based on a number of valid video frames.

4. The method of claim 3, wherein the tiered determination comprises a low bit error rate determination when the number of valid video frames is zero and a high bit error rate determination when the number of valid video frames is not zero.

5. The method of claim 2, wherein the link degraded threshold for the link degraded threshold variable is determined according to a function of at least one of input power, temperature and time.

6. The method according to claim 2, wherein the link degraded threshold for the link degraded threshold variable is determined according to a function of each of input power, temperature and time.

7. The method of claim 1, further comprising:
   sending a link fault status message if the number of video frames without a CRC error is less than a link degraded threshold variable when a CRC error is determined present in the video signal.

8. The method of claim 1, further comprising:
   sending a measuring data status message; and
   continuing to send a recent status message, the recent status message one of: the measuring data status message, the link OK status message, a link degraded status message and a link fault status message until the determining results in a change of status.

9. The method of claim 1, wherein determining if the CRC error is present in the video signal comprises analyzing a limited amount of data as compared to a total amount of data of a video frame of the plurality of video frames.

10. The method of claim 9, wherein the limited amount of data analyzed is limited according to a data type, wherein the data type comprises an object data type.

11. The method of claim 1, wherein determining if the CRC error is present in the video signal comprises determining if a bit error is detected within a percentage of data within the plurality of frames, and wherein an overall bit error of the plurality of frames is obtained by scaling the bit error according to the percentage.

12. The method of claim 1, wherein determining if the CRC error is present in the video signal comprises analyzing a limited amount of data, wherein the limited amount of data analyzed is limited according to a data percentage, wherein the data percentage is based on a total amount of data in transit in an optical fiber link analyzed.

13. The method of claim 1, further comprising adjustably setting the link OK threshold based upon a type of optical fiber link analyzed to ensure a desired performance level.

14. An apparatus for measuring and reporting optical fiber link signal quality, comprising:
   an integrated circuit configured for:
   receiving at least one video signal, the at least one video signal received via at least one video channel, the at least one video signal having a plurality of video frames;
   determining if a Cyclic Redundancy Check (CRC) error is present in the at least one video signal;
   counting the plurality of video frames without a CRC error;
   sending a link OK status message when the fiber link signal quality one of: meets and exceeds a link OK threshold, the link OK threshold a measure of a quality of the video signal, the link OK threshold indicating the video signal is of a high quality and low error, the fiber link signal quality based on the counting; and
   sending a link degraded status message when the fiber link signal quality is less than the link OK threshold and one of: meets and exceeds a link degraded threshold when a CRC error is determined present in the at least one video signal, the link degraded threshold a measure of the quality of the video signal, the link degraded threshold indicating the video signal is of an operational quality with low error, the fiber link signal quality based on the counting.

15. The apparatus of claim 14, wherein the integrated circuit is further configured for counting the plurality of video frames without the CRC error by counting a number of Object 2 words received by a display.

16. The apparatus of claim 15, wherein meeting and exceeding the link OK threshold is based on the number of Object 2 words received without error.

17. The apparatus of claim 14, wherein the link degraded threshold is determined according to a function of at least one of input power, temperature and time.

18. The apparatus according to claim 14, wherein the link degraded threshold comprises a link degraded threshold variable determined according to a function of each of input power, temperature and time.

19. A non-transitory computer readable medium having non-transitory computer readable program code embodied therein for measuring and reporting optical fiber signal quality, the computer readable program code comprising instructions which, when executed by a display processing computer device, cause the display processing computer (DPC) to perform and direct the steps of:
   receiving a link OK threshold variable and a link degraded threshold variable;

receiving at least one video signal as the video signal transits from DPC to a display device, the at least one video signal received via at least one video channel, the at least one video signal having a plurality of video frames;

determining if a Cyclic Redundancy Check (CRC) error is present in the at least one video signal;

determining a number of video frames without a CRC error from the plurality of video frames;

sending a link OK status message from the display device to the DPC when the determining results in a number of video frames without a CRC error one of:

meets and exceeds the link OK threshold variable, the link OK threshold variable a measure of a quality of the video signal, the link OK threshold variable indicating the video signal is of a high quality and low error; and sending a link degraded status message from the display device to the DPC when the number of video frames without a CRC error is less than the link OK threshold variable and one of: meets and exceeds the link degraded threshold variable when a CRC error is determined present in the at least one video signal, the link degraded threshold variable a measure of the quality of the video signal, the link degraded threshold variable indicating the video signal is of an operational quality with low error.

20. The non-transitory computer readable medium of claim 19, the DPC further configured to perform and direct the steps of:

sending a measuring data status message from the display device to the DPC;

sending a link fault status message from the display device to the DPC if the number of video frames without a CRC error is less than the link degraded threshold variable when a CRC error is determined present in the at least one video signal; and continuing to send a recent status message from the display device to the DPC, the recent status message one of: the measuring data status message, the link OK status message, the link degraded status message and the link fault status message until the determining results in a change of status, wherein determining the number of video frames without a CRC error from the plurality of video frames is based on an analysis of a percentage of data within the at least one video signal as the video signal transits from DPC to a display device, the percentage of data being less than one-hundred percent of the data.

* * * * *